(12) United States Patent
Nethi et al.

(10) Patent No.: US 9,774,588 B2
(45) Date of Patent: Sep. 26, 2017

(54) SINGLE SIGN OFF HANDLING BY NETWORK DEVICE IN FEDERATED IDENTITY DEPLOYMENT

(71) Applicant: Cisco Technology, Inc., San Jose, CA (US)

(72) Inventors: Ramesh Nethi, Bangalore Karnataka (IN); Srinivas Chivukula, Bangalore Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 54 days.

(21) Appl. No.: 14/506,867

(22) Filed: Oct. 6, 2014

(65) Prior Publication Data

US 2016/0099931 A1  Apr. 7, 2016

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| H04L 29/08 | (2006.01) |
| H04W 4/00 | (2009.01) |
| H04L 9/08 | (2006.01) |

(52) U.S. Cl.
CPC ........ *H04L 63/0815* (2013.01); *H04L 9/0891* (2013.01); *H04L 67/10* (2013.01); *H04L 67/142* (2013.01); *H04W 4/003* (2013.01)

(58) Field of Classification Search
CPC ... H04L 63/0815; H04L 63/08; H04L 63/083; G06F 21/41; H04W 12/06
USPC .......................................................... 726/8
See application file for complete search history.

(56) References Cited

U.S. PATENT DOCUMENTS

| | | | |
|---|---|---|---|
| 7,219,154 B2 * | 5/2007 | Blakley, III | ........ H04L 63/0807 709/227 |
| 8,380,790 B2 | 2/2013 | Lee et al. | |
| 8,468,244 B2 * | 6/2013 | Redlich | .................. G06Q 10/06 705/50 |
| 2004/0128393 A1 * | 7/2004 | Blakley, III | ........ H04L 63/0807 709/229 |
| 2009/0254572 A1 * | 10/2009 | Redlich | .................. G06Q 10/06 |
| 2014/0105103 A1 | 4/2014 | Nethi et al. | |
| 2014/0237539 A1 | 8/2014 | Wing et al. | |

OTHER PUBLICATIONS

Assertions and Protocols for the OASIS Security Assertion Markup Language (SAML) V2.0 Mar. 15, 2005, OASIS Standard.
SAML V2.0 Asynchronous Single Lohout Profile Extension Version 1.0, Committee Specification 01, Nov. 22, 2012, OASIS.
Sobón et al., Public Cloud Computing for Software as a Service Platforms, Accessed Aug. 6, 2014, Computer Science.

* cited by examiner

*Primary Examiner* — Kambiz Zand
*Assistant Examiner* — Stephen Sanders

(57) ABSTRACT

In one implementation, a network device provides a single signoff service to one or more endpoints in software as a service (SaaS) sessions. The network device is configured to monitor a session between a software as a service (SaaS) provider and an endpoint device and to identify a network event trigger associated with the session. In response to the network event trigger, a signoff message is generated to the SaaS provider by the network device. The SaaS provider is configured to purge the session in response to the signoff message.

20 Claims, 6 Drawing Sheets

US 9,774,588 B2

SINGLE SIGN OFF HANDLING BY NETWORK DEVICE IN FEDERATED IDENTITY DEPLOYMENT

TECHNICAL FIELD

This disclosure relates in general to the field of software as a service (SaaS), and more particularly, to a single sign off for SaaS providers.

BACKGROUND

Software as a service (SaaS) is a technique for distributing and marketing software as a subscription-based service. Rather than load software onto a laptop or personal computer, the user subscribes to software that is hosted in a central location, often termed the cloud. SaaS gained popularity with database and management software or high cost software with low frequency usages such as computer aided design, however, nearly any type of software is now available through SaaS, including word processing, spreadsheets and even operating systems.

One drawback to SaaS is that another layer of authentication is added to the user's daily routine. A user may turn on a laptop then log into the laptop, the local area network or wireless network, then be prompted for authentication again every time SaaS is accessed. Techniques have been proposed in which a user gains access to multiple services after providing credentials only once. However, these techniques leave security holes in certain scenarios.

BRIEF DESCRIPTION OF THE DRAWINGS

Exemplary embodiments of the present embodiments are described herein with reference to the following drawings.

DESCRIPTION OF EXAMPLE EMBODIMENTS

Overview

Figure 1:
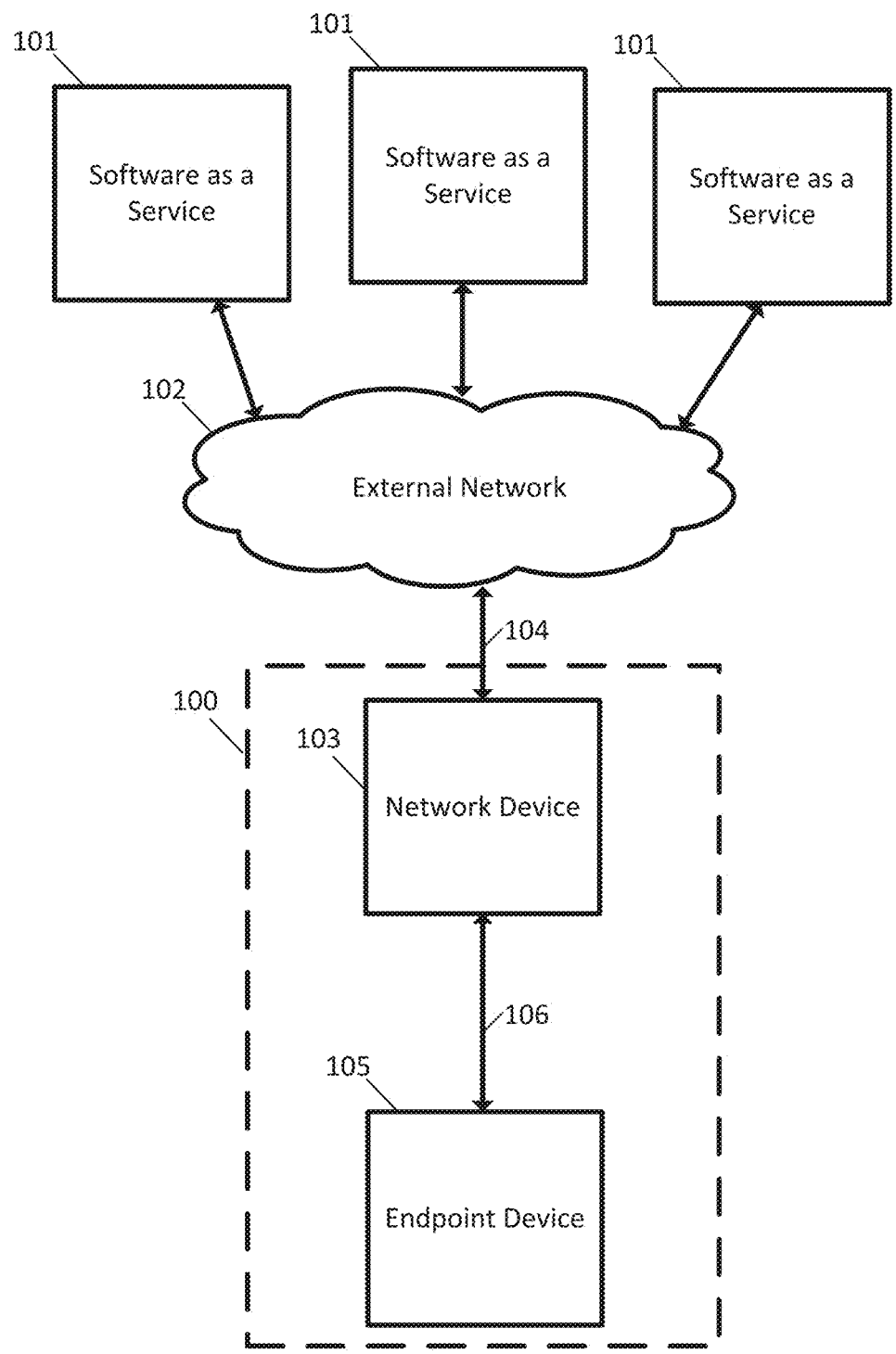
FIG. 1 illustrates an example system for a single sign off for multiple SaaS.

At least one embodiment includes monitoring a session between a software as a service (SaaS) provider and an endpoint device and identifying, at a network device connected to the endpoint device, a network event trigger associated with the session. A signoff message is generated based on the network event trigger, and the SaaS provider is configured to purge the session in response to the signoff message.

At least one embodiment includes instructions to detect a network event trigger associated with an endpoint and access a session database for software as a service (SaaS) sessions for an entry associated with the endpoint. From the entry, a SaaS provider is identified and a signoff message is sent to the SaaS provider based on the network event trigger.

EXAMPLE EMBODIMENTS

Single sign-on (SSO) is a mechanism to access software as a service (SaaS) without the uses of separate logins (e.g., usernames and passwords) for both the local network and the remote service providers that provide SaaS. The service providers are third parties separate from the user and the network. One example of SSO is the federated single sign on model (FSSO). FSSO links a user's identity across multiple SaaS providers. FSSO may provide a single authentication ticket or token that is accepted by the multiple SaaS providers.

A SSO gateway is a network device configured to act as federation broker. The federation broker translates internal credentials for the local area network to an open-standard federation assertion. An example of internal credentials includes an assertion from a local network security protocol. The security protocol may be WebAuth, http-basic, Windows NT local area network manager (NTLM) authentication protocol, Kerberos protocol, active directory NT LAN manager or another technique. An example of an open-standard federation assertion is provided by security association markup language (SAML), which is an open-standard for exchanging authentication and authorization between parties that may be unrelated. The open-standard federation assertion, such as SAML, may be accepted by SaaS providers for authentication. This model enables users to seamlessly log in to the SaaS application without providing separate logins (e.g., usernames and passwords). The SaaS providers may add the user's authentication to an authentication cache in a SaaS server in response to acceptance of the open-standard federation assertion.

These techniques enhance the user's experience for SaaS. However, when the user signs off from the local area network without signing off from one or more SaaS providers, there is no explicit mechanism or instructions that the SaaS application servers or providers can employ to purge the user session from the authentication cache. This could potentially open a security hole. Also, the SaaS application may be left with numerous stale sessions from users that have logged off their local network, leaving the SaaS session dangling. The stale sessions may be removed upon duration of a timeout, but resources allocated to the stale sessions are released later than necessary. Resources that are allocated unnecessarily reduce the overall performance and experience for all users.

Similarly, the network service platforms hosting cloud connectors are becoming popular, in which cloud connectors hosted on these network platforms help the users to locate the services in the cloud and seamlessly get services from a branch kind of deployment. Network platforms identify connectors and security connectors which enable cloud based SaaS services to deliver used based and policy based services to the users in a branch kind of deployment. As the number and type of connectors grow, network service platforms could benefit from a deterministic way to detect the user sign-off events so the authentication sessions managed for the user by these connectors need to be purged in real time to not open any security holes for a rogue application to exploit.

Many of the authentication mechanisms deployed by cloud connectors and SaaS gateways depend upon predefined time outs for purging user authentication sessions because the authentication mechanisms do not have visibility in to the network systems that track user based events like network logoff, migration and user policy changes. Network edge routers such as hosting connectors, depend upon timeouts for purging user authentication sessions, in the absence of ability to snoop dynamic host configuration protocol (DHCP) lease expiry events. Further, none of these mechanisms remove or update the user authentication sessions in real time or substantially real time.

The following embodiments include an algorithm and a device for network services to act as a conduit for propagating the user events on the local area network, such as user network log-off, user network policy change, and user internet protocol (IP) lease expiry events, to interested parties such as the SaaS providers.

FIG. 1 illustrates an example system for a single sign off for multiple SaaS. The system includes a local area network 100 and an external network 102 coupled with one or more SaaS providers 101. The external network 102 may be part of the Internet. The local area network 100 and the external network 102 are coupled by communication path 104. The local area network 100 includes a network device 103 and one or more endpoint devices 105 coupled with a communication path 106. The communication path 104 may be provided by an internet service provider or may any access path to the Internet. The communication path 106 may be a wired or wireless communication path such as Ethernet, the family of protocols known as WiFi or IEEE 802.11, or the family of protocols known as Bluetooth. Additional, different, or fewer components may be included.

The endpoint device 105 may be a laptop computer, personal computers, mobile devices, set top boxes, tablet computers, or any computing device configured for network communication. The endpoint device 105 is configured to connect to one or more SaaS providers 101. The endpoint device 105 may be authenticated by or login with the network device 103 to access the local area network 100, and the external network 102 (e.g., the internet) through the local area network 100.

The network device 103 may also include a single sign on service in which the authentication or login approved by the network device 103 is sent to the one or more SaaS providers 101. For example, the network device 103 may generate a cookie or other message including data indicative of the user that was authenticated. In addition to identity or username, the cookie may include a timestamp when the authentication occurred and an expiration date or time for the authentication. The cookie may also include data indicative of a privilege level for the user and an authentication history for the user. The network device 103 may encrypt the cookie and securely transmit the cookie using an encrypted channel (e.g., secure sockets layer).

The endpoint 105 may attempt to connect to one or more of the SaaS providers 101. In response, the network device 103 sends the cookie or other message to the SaaS providers 101 and the SaaS providers 101 analyze the cookie to connect to the endpoint 105 and identify the user.

After a session is established between the endpoint 105 and one or more of the SaaS providers 101, the network device 103 may monitor the session. For example, the network device 103 may identify endpoints as the sessions are established and compile a list of endpoints with active sessions. For endpoints with active sessions, the network device 103 identifies when a network event trigger occurs that is associated with an active session.

A network event trigger is an event that indicates a change in the connection state between the endpoint 105 and the network device 103. The network event trigger may be generated in response to the endpoint 105 disconnecting from the local area network 100. The network event trigger may be a user network log-off, a user network policy change, or a user IP lease expiry event.

The network device 103 is configured to generate a signoff message in response to the network event trigger. The signoff message instructs the one or more SaaS providers 101 to end active sessions associated with the endpoint 105. The signoff message may include data indicative of the endpoint 105 and a timestamp for the network event trigger. The SaaS providers 101 may purge any security tokens associated with the endpoint 105 in response to receiving the signoff message. Multiple sessions associated with the endpoint 105 at different services may be purged. Accordingly, stale sessions are immediately removed from the SaaS providers 101 and resources are made available for other users. In addition, security holes associated with stale sessions, especially stale session for dynamic IP addresses, are eliminated or reduced.

In one example, rather than immediately purge the sessions associated with disconnected endpoints, the SaaS providers 101 start a timer in response to the network event trigger. The timer allows for temporarily disconnected endpoints to rejoin the network and the SaaS service within a predetermined time. If the timer reaches the predetermined time period, the SaaS providers 101 proceed with purging the associated sessions.

Upon purging or deleting security tokens associated with the endpoint 105 or other endpoints, the SaaS providers 101 may generate an acknowledgement message. The acknowledgement message includes data indicative of the user or the endpoint 105, the identity of the SaaS, the timestamp when the security token was deleted or purged, and the network event trigger that caused the security token to be deleted or purged.

Figure 2:
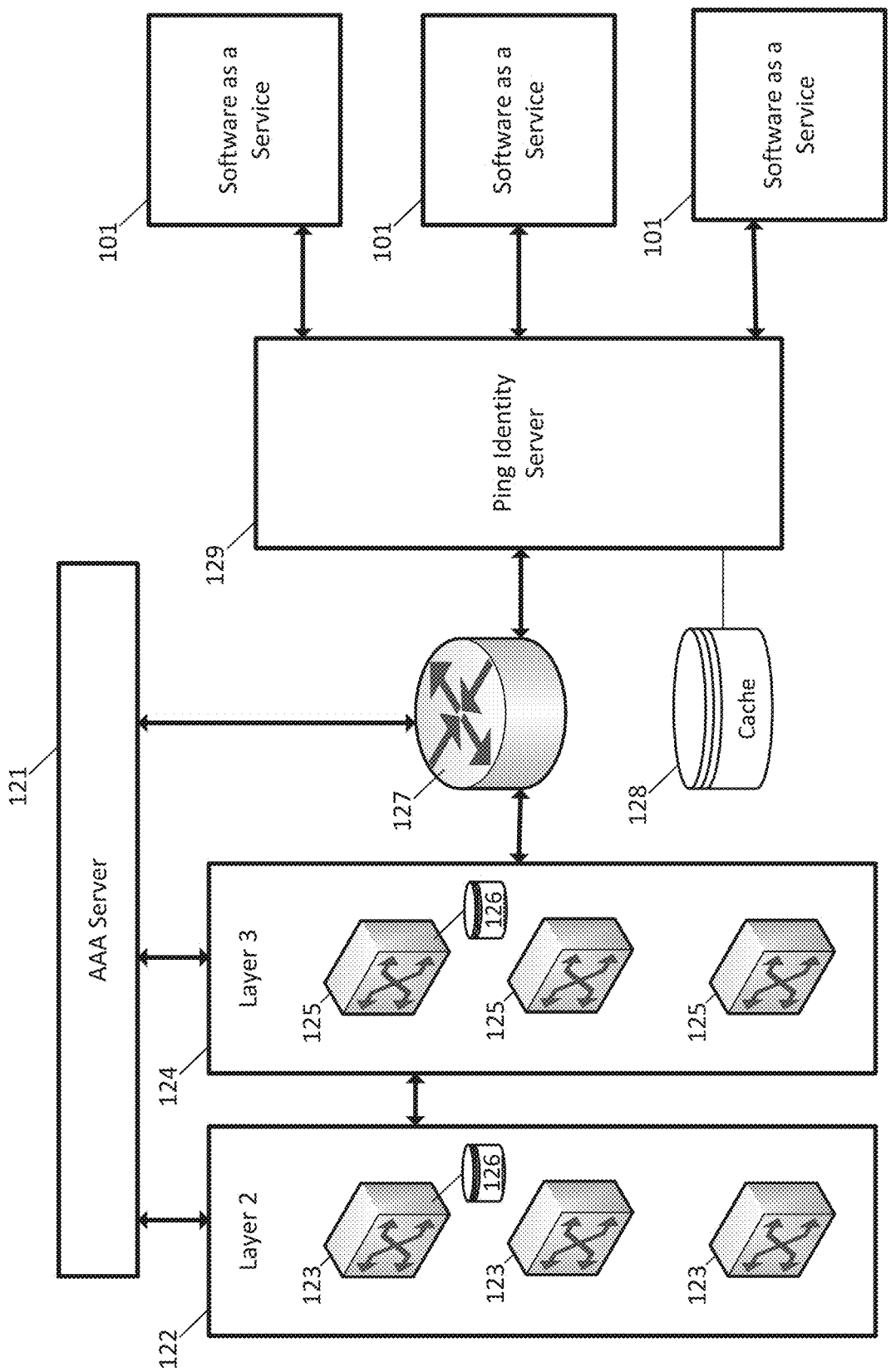
FIG. 2 illustrates an example network for a single sign off for multiple SaaS with multiple network event locations.

FIG. 2 illustrates an example network for a single sign off for multiple SaaS with multiple network event locations. The network may include an authentication, authorization and accounting (AAA) server 121, a layer 2 network portion 122, a layer 3 network portion 124, and an edge router 127. The network is in communication with one or more SaaS providers 101, for example through federated single sign on service (FSSO) server 129. The FSSO may be a ping identity server or another type of sign on service network device. The layer 2 network portion 122 may include one or more layer 2 switches 123, optionally including a user database 126, and the layer 3 network portion 124 may include one or more layer 3 switches 125, optionally including a user database 126. Additional, different, or fewer devices may be included in the network.

The AAA server 121, the layer 2 switches 123, the layer 3 switches 125, and the edge router 127 are examples of network devices configured to identify network event triggers. More than one network device may detect network trigger events for the same endpoint. In one example, a particular network device (e.g., the edge router 127) may collect data from multiple network devices in order to identify a network trigger event.

The AAA Server 121 may detect a network trigger event when a logoff event is detected. The AAA Server 121 may manage endpoints and control what services and devices the endpoints have access to. The AAA server 121 may authenticate users or endpoints according to a credential received from the endpoints or credential data that proves the endpoint is in possession of the credential. Example credentials include tokens, digital certificates, and digital signatures. The AAA server 121 detects a logoff event when the endpoint is disconnected from the AAA server 121. The logoff event may be intentional (e.g., the user selects logoff)

or unintentional (e.g., the endpoint is disconnected). The AAA server 121 detects a network event trigger when there is a change in the network profile or policy while the endpoint is authenticated by the AAA server 121, forcing the user to re-authenticate.

The layer 2 switches 123 may detect a network trigger event when users connect or disconnect to the network. The connection may be an Ethernet connection or Wifi connection. The layer 2 switches 123 are aware of connected endpoints and are configured to immediately identify when any endpoint disconnects, which may be referred to as a connectivity shutdown. The layer 2 switches 123 may maintain a user database 128 including a cache of currently or recently connected endpoints.

The layer 3 switches 125 may detect a network trigger event when an IP address assignment is changed. For example, the layer 3 switches 125 may be configured to assign IP addresses to endpoints. When an IP address is re-assigned, from one endpoint to another, the former endpoint is no longer connected to the network, and the layer 3 switches generate a network trigger event. Similarly, when an IP address lease expires, the layer 3 switches generate a network trigger event. The lease may be assigned according to DHCP, and the network trigger event may be a DHCP lease expiry. Alternatively, the network trigger event may be based on a renewal request, which also indicates a change in IP address. The layer 3 switches 125 may maintain a user database 128 include a cache of currently or recently connected endpoints.

The network event trigger may be the suspension of a user account on the network. When an administer suspends an user account in a lightweight directory access protocol (LDAP) server or active directory, the user ceases to be active in the domain and can no longer access any file, print, or mail services in the domain. Similar experience should be enforced on the network as well. An AAA service may detect a change in the user profile (e.g., data indicative of a user suspension) and send out a network event for the network devices to clean the cache and issue single sign-off.

The network event trigger may be based on L7 authentication. L7 authentication may include WebAuth for accessing internet or internal web services. L7 authentication may be used in networks with no applicable L2 or L3 authentication device. In such cases, if the user logs off from the network, the user's WebAuth session may be purged and subsequently a single sign off with all applicable SaaS services is performed.

Figure 3:
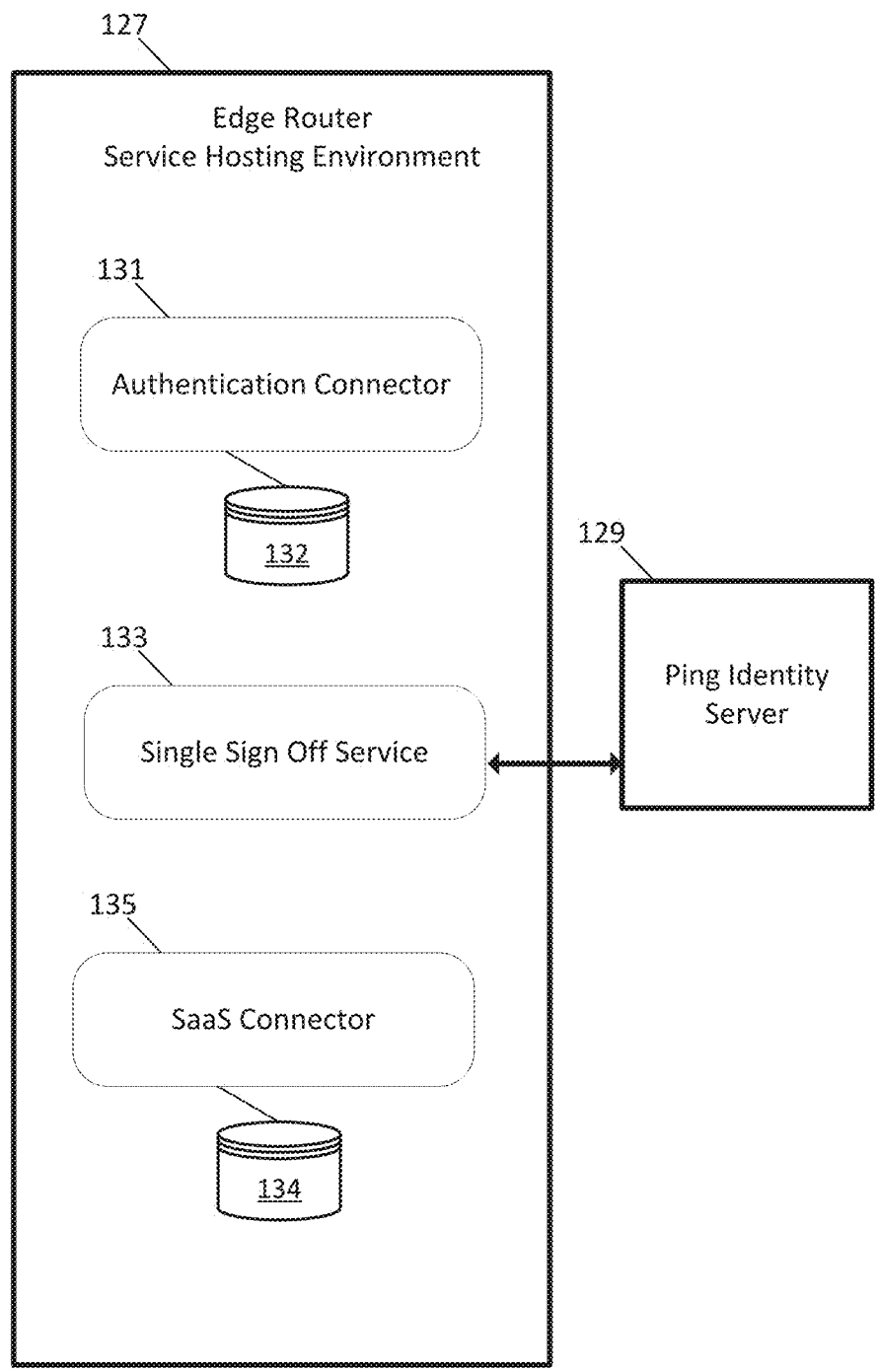
FIG. 3 illustrates an example edge router from the network of FIG. 2.

FIG. 3 illustrates the edge router 127 from the network of FIG. 2. The edge router 127 may be an integrated services router. The edge router 127 may include an authentication connector 131 that manages a session database 132, a single sign off service 133, and a SaaS connector 135 that manages another session database 134. The session databases may be integrated. Additional, different, or fewer components may be included.

The authentication connector 131 establishes authentications between the endpoints and the network. The authentication connector 131 adds an entry in the session database 132 when a user or an endpoint is authenticated on the network. The authentication may remove an entry when an endpoint disconnects from the network.

SaaS connector 135 tracks individual sessions of endpoints and SaaS providers. When the edge router 127 sends authentication information to one of the SaaS providers 101, an entry is added to the session database 134. The session database 134 is a running list of the currently active sessions with SaaS providers. Some endpoints may have multiple entries in the session database 134.

The edge router 127 may detect a network trigger event by monitoring communications to and from the endpoint. The edge router 127 may collect data regarding network events from multiple network devices. For example, the layer 2 switches 123 and the layer 3 switches 125 may communicate any of the events described above to the edge router 127. Upon receiving or identifying a network trigger event, the edge router 127 may extract the IP address or other identifier for the endpoint from the network trigger event and query one or more of the session databases 132 and 134. For example, the edge router 127 may determine whether the session database 134 includes an active SaaS session for the endpoint. If there is an entry for such a session, the edge router 127 sends the network event trigger to the associated SaaS provider. In one example, the edge router 127 first queries session database 132 to determine whether the endpoint has been authenticated.

The single sign off service 133 may send an event message upstream as a result of any detected events for endpoints in the session databases. The single sign off service 133 may be configured to send the event message only when the trigger is of a specified type such as disconnect, logoff, and IP lease expiry. In another example, the single sign off service 133 may perform a redundancy check in which at least two network events are received from other switches or routers before the event trigger message is generated and sent to a SaaS provider or an identity server.

The AAA server 121, single sign off service 133 or the edge router 127 may propagate data or messages indicative of the network event trigger to other devices on the network or upstream on communication paths leaving the network. For example, edge router 127 may publish the network event using a publish and subscribe (pub-sub) system. The edge router 127 may generate a message to be published include a keyword (e.g., signoff) or identifier that indicates the message is a class of messages related to signoffs for the local network. The class of messages may be signoff messages or cache purge messages.

Other application services hosted on the edge router 127 (e.g., authentication connectors and SaaS connectors) are subscribers to the published messages. The SaaS providers 101, the FSSO server 129, or other devices may receive instructions from the subscribers. The SaaS providers 101 may be configured to purge an entry in the session cache (e.g., user credentials, user tokens, or directory entries associated with a user) in response to receiving the instructions. The SaaS providers 101 may be configured to purge security tokens belonging to endpoints in response to receiving messages listing those endpoints. The single sign off service may have established trust with SaaS provider to issue sign off on behalf of the endpoint.

In addition or in the alternative, multicast communication between L2 or L3 devices (e.g., switches or routers) may be communication upstream. For example, when a user is unplugged from the network, the corresponding switch generates a multicast message and sends the multicast message to the group. In response, upstream switches and edge routers in the group, receive the multicast message and remove the user database entry for the end-point.

In another embodiment, the individual network devices including any combination of the AAA server 121, the layer 2 switches 123 and the layer 3 switches 125 may play the role of publisher and publish the signoff class of messages. The network devices like may participate in a multicast group and may post messages about the interesting network events. All network devices and services that listen for the network events may play the role of subscribers and purge corresponding authentication caches appropriately. The network devices with hosted services may receive these messages and publish in a pub-sub messaging group.

Figure 4:
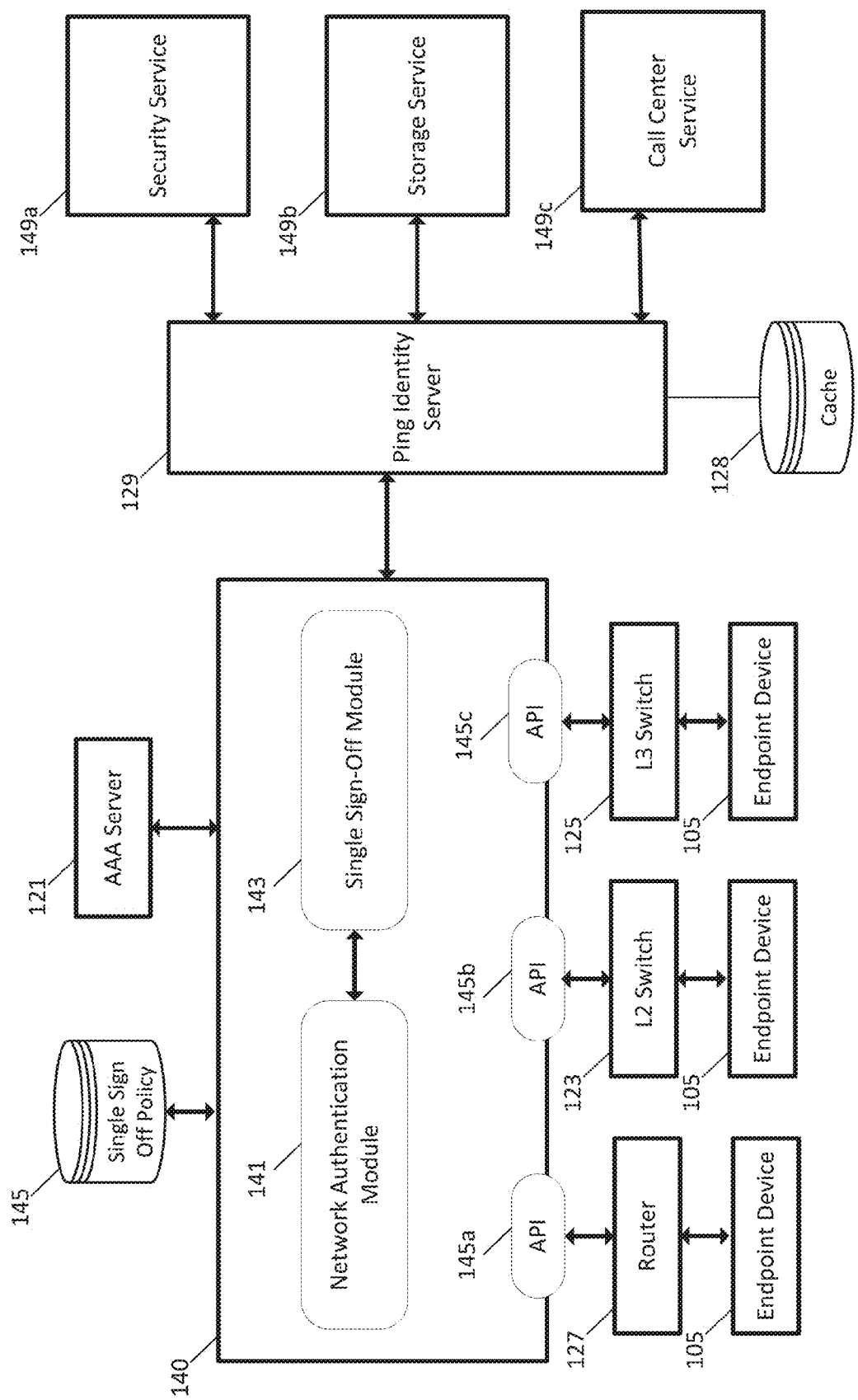
FIG. 4 illustrates an example network for a single sign off for multiple SaaS with multiple network event locations.

FIG. 4 illustrates an example network for a single sign off for multiple SaaS with multiple network event locations. The network includes a software-defined network (SDN) controller 140, in addition to the AAA server 121, and at least one of a L2 switch 123, an L3 switch 125, or a router 127, any combination of which is connected to one or more endpoints 105. The network is in communication with the FSSO server 129 and one or more services 149a-c. The SDN controller 140 may include a network authentication module 141 and a single sign-off module 143. Internally or externally, the SDN controller 140 may include a single sign-off database 145. Additional, different, or fewer components may be included.

The services 149a-c may include any combination of a security service 149a, a storage service 149b, and a call center service 149c. The security service 149a may include one or more of a firewall, malicious content blocking, or content filtering. The security service 149a may monitor content transferred (e.g., inbound and/or outbound) between the endpoints 105 and the Internet. The security service 149a may block or filter data traffic that is prohibited (e.g., adult content or copyrighted content) defined according to user policies. The security service 149a may block malicious content based on a blacklist of IP addresses, domain names, or content providers. The storage service 149b may include cloud-based data storage or databases. The call center service 149c may include a cloud-based call center that provides call routing, user databases, and customer service profiles to the endpoints 105.

The SDN controller 140 may host the network authentication module 141 and the single sign-off module 143. The network authentication module 141 may be configured to authenticate endpoints 105. The endpoints 105 may present a user with a login prompt and the user may provide one or more credential that is verified by the network authentication module 141. The network authentication module 141 may generate a token for authenticated endpoints 105 based on the verification. The network authentication module 141 may store an entry for each verified endpoint in the database 145. The network authentication module 141 may also track communication with services 149a-c. When one or more of the endpoints 105 attempt to access services 149a-c, the network authentication module access the corresponding entry in the database 145 and forwards authentication data (e.g., token) to the corresponding services 149a-c.

The single sign-off module 143 is in communication with any combination of network devices including the L2 switch 123, the L3 switch 125, or the router 127. The single sign-off module 143 may be configured to receive data indicative of network event triggers corresponding to endpoints 105 disconnecting from the network or a change in policy. The single sign-off module 143 may identify the endpoint from the network event trigger data and access database 145 according to the identity to determine which of the services have an active session with the endpoint. The single sign-off module 143 may generate a signoff message including the identity in response to the network event trigger and address the signoff message to the corresponding services. The services 149a-c are configured to purge or delete authentication data or tokens based on the identity of the endpoint in the signoff message.

The SDN controller 140 may include one or more application programming interfaces (APIs) 145a-c. Each of the APIs 145a-c may correspond to different network devices. For example, API 145a connects the SDN controller 140 to the router 127, API 145b connects the SDN controller 140 to the L2 switch 123, and the API 145c connects the SDN controller 140 to the L3 switch 125. The API facilitates the communication of network event data from the network devices to the SDN controller 140.

The SDN controller 140 may include hosted connectors corresponding to the services 149a-c and in communication with the network devices through the APIs 145a-c. The hosted connectors may directly communicate with the services 149a-c or indirectly through the FSSO server 129 to ensure that all the authorization tokens generated for the endpoint are purged in real time or substantially real time.

Figure 5:
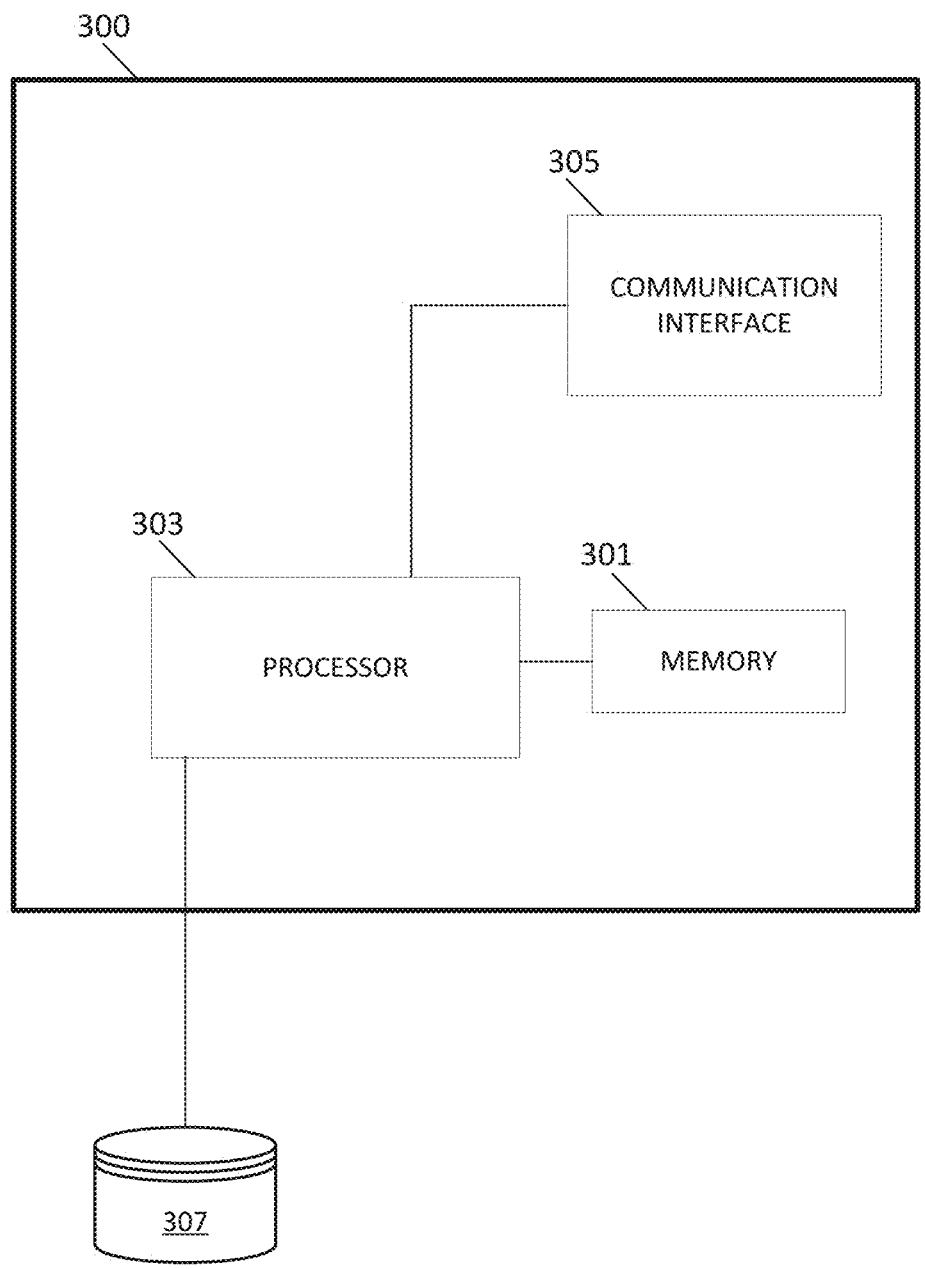
FIG. 5 illustrates an example network device for detecting local network events.

FIG. 5 illustrates an example network device 300 for the networks of FIG. 1 through FIG. 4. The network device 300 includes at least a memory 301, a controller 303, and a communication interface 305. In one example, a database 307 stores entries for authenticates sessions between SaaS services and endpoints connected to the network device 300. Additional, different, or fewer components may be provided. Different network devices may have the same or different arrangement of components.

The network device 300 may be configured to perform local authentication for one or more endpoint devices using any authentication protocol. The authentication protocol may be 802.1x (dot 1x), media access control (MAC) authentication bypass (MAB), or web authentication. Authentication in 802.1X includes interaction between three entities, a supplicant such as service providers 101, an authenticator such as network device 300, and an authentication server to support the authenticator.

Web authentication (WebAuth) maybe a supplement to or substitute for 802.1X authentication. WebAuth may be deployed in public hotspots (e.g., hotel rooms or coffee shops). The host launches a browser in order to be authenticated with the network device 300 using WebAuth. In WebAuth, credentials may be entered in we-based login pages. With WebAuth, every port in the network device 300 may be configured in the same way. The WebAuth process links the username with an IP address, a MAC address, a switch, and a port. The network device 300 may be configured to attempt authentication with 802.1X and, if unsuccessful, fall back to authentication using WebAuth or MAB.

Figure 6:
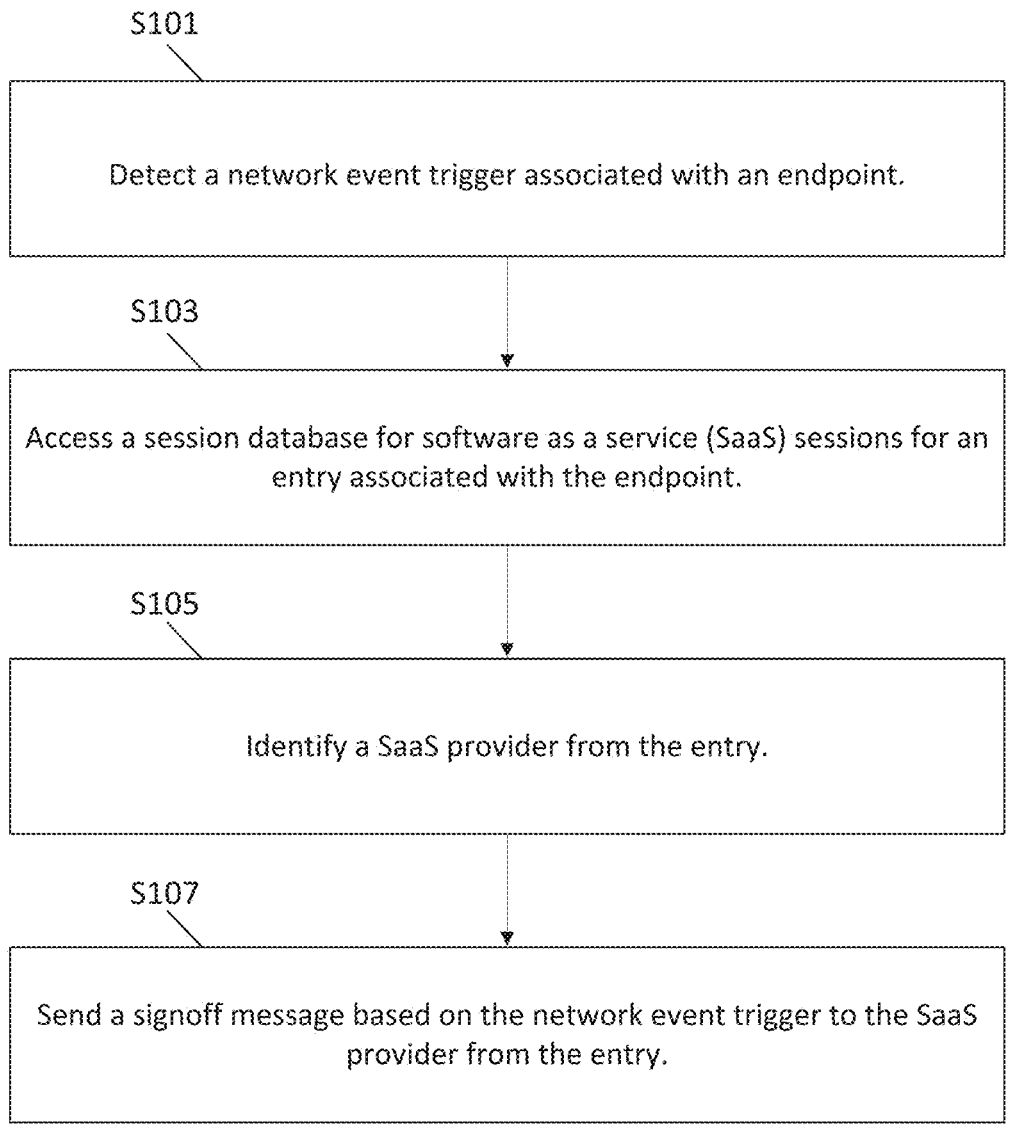
FIG. 6 illustrates an example flowchart for implementing a single sign off based on a local network event.

FIG. 6 illustrates an example flowchart for a single signoff service by the network device 300. Additional, different, or fewer acts may be provided. The acts are performed in the order shown or other orders. The acts may also be repeated.

At act S101, the processor 303 detects a network event trigger associated with an endpoint. The network event trigger may be any event that indicates that an endpoint has become disconnected from a local network. The network event trigger may be based on connections between the endpoint and a router or a switch. The processor 303 may identify a user identity for the endpoint. The user identity may be a username, an IP address, a hostname, or other identifying data that uniquely identifies the endpoint at least on the local area network.

The network device 300 may be a passive proxy for the endpoints. The passive proxy receives requests from the endpoints to access SaaS services. The passive proxy performs an authentication process with the SaaS services on behalf of the endpoint. One example passive proxy is a security services connector. The security service connector authenticates an endpoint and accesses a security policy for the endpoint. The policy and the authentication are provided to the SaaS provider, which may enforce the policy on data traffic associated with the endpoint.

At act S103, the processor 303 accesses a session database in memory 301 or another location for SaaS sessions for an entry associated with the endpoint. The entry in the session database may include a credential. The credential may be a password, a certificate file, a secret key, a cryptographic file, or a pretty good protection (PGP) key.

At act S105, the processor 303 may identify one or more SaaS providers from the entry from the session database. The processor 303 may access IP addresses or domain names associated with the SaaS providers that have current sessions with the endpoint. At act S107, the communication interface 305 sends a signoff message based on the network event trigger to the SaaS provider from the entry. The signoff message may include the identity of the endpoint. The one or more SaaS providers may read the identity of the endpoint and identify sessions and associated tokens for the endpoints. The one or more SaaS providers purge the token or tokens associated with the session in response to the signoff message. Thus, stale sessions are removed from the SaaS providers, freeing up scarce resources for other users or other endpoints.

The controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 300, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   at a network device having network connectivity to an endpoint device, monitoring a session between a software as a service (SaaS) provider and the endpoint device by monitoring communications to and from the endpoint device;
   identifying, at the network device, a network event trigger associated with the session based on the monitoring, wherein the network event trigger indicates a change in a connection state between the endpoint device and the network device;
   in response to the identifying of the network event trigger, initiating a timer that measures a predetermined time period for the endpoint device to rejoin the session;
   generating a signoff message at an expiration of the predetermined time period measured by the timer; and
   transmitting the signoff message to the SaaS provider to cause the SaaS provider to purge the session when the timer reaches the predetermined time period.

2. The method of claim 1, wherein additional SaaS providers are participating in additional sessions with the endpoint device and transmitting further comprises:
   transmitting the signoff message to the additional SaaS providers to cause the additional SaaS providers to purge the additional sessions.

3. The method of claim 2, further comprising:
   extracting an identifier of the endpoint device from the network event trigger;
   querying a session database maintained by the network device with the identifier to identify the additional sessions with the additional SaaS providers; and
   performing a redundancy check based on the identifier to ensure that the transmitting of the signoff message transmits one copy of the signoff message to each of the additional SaaS providers.

4. The method of claim 1, wherein the network event trigger is a connectivity shutdown detected by the network device, and the network device is a layer 2 device.

5. The method of claim 1, wherein the network event trigger is an internet protocol (IP) lease expiry, and the network device is a layer 3 device.

6. The method of claim 1, wherein the network event trigger is a logout message, and the network device is an authentication, authorization and accounting (AAA) server.

7. The method of claim 1, wherein transmitting comprises:
   publishing the signoff message in a publish and subscribe system, wherein a plurality of SaaS providers are configured to receive the signoff message from the publish and subscribe system.

8. The method of claim 7, wherein the plurality of SaaS providers are configured to purge tokens for the endpoint device in response to the signoff message.

9. The method of claim 1, wherein the SaaS provider is configured to filter traffic associated with the endpoint device based on a user policy.

10. An apparatus comprising:
    a memory configured to store at least one session entry, wherein the at least one session entry describes communications to and from an endpoint device during a session between a software as a service (SaaS) provider and the endpoint device;
    a controller configured to:
       identify a network event trigger associated with the session, wherein the network event trigger indicates a change in a connection state of the endpoint device;
       in response to the identifying of the network event trigger, initiate a timer that measures a predetermined time period for the endpoint device to rejoin the session; and
       generate a signoff message at an expiration of the predetermined time period measured by the timer; and
    a communication interface configured to:
       transmit the signoff message to the SaaS provider to cause the SaaS provider to purge the session when the timer reaches the predetermined time period.

11. The apparatus of claim 10, wherein additional SaaS providers are participating in additional sessions with the endpoint device and, in transmitting, the communication interface is further configured to:
    transmit the signoff message to the additional SaaS providers to cause the additional SaaS providers to purge the additional sessions.

12. The apparatus of claim 11, wherein the controller is further configured to:
    extract an identifier of the endpoint device from the network event trigger;
    query a session database maintained in the memory with the identifier to identify the additional sessions with the additional SaaS providers; and
    perform a redundancy check based on the identifier to ensure that the transmitting of the signoff message transmits one copy of the signoff message to each of the additional SaaS providers.

13. The apparatus of claim 10, wherein the network event trigger is a connectivity shutdown detected by the network device, and the network device is a layer 2 device.

14. The apparatus of claim 10, wherein the network event trigger is an internet protocol (IP) lease expiry, and the network device is a layer 3 device.

15. The apparatus of claim 10, wherein the network event trigger is a system logout message, and the network device is an authentication, authorization and accounting (AAA) server.

16. The apparatus of claim 10, wherein the network event trigger is a change in a user account or a user policy associated with the endpoint device.

17. The apparatus of claim 10, wherein in transmitting, the communication interface is further configured to:
publish the signoff message in a publish and subscribe system, and a plurality of SaaS providers are configured to receive the signoff message from the publish and subscribe system.

18. A non-transitory computer readable medium including instructions that when executed are configured to cause a processor to:
monitor a session between a software as a service (SaaS) provider and an endpoint device by monitoring communications to and from the endpoint device;
detect a network event trigger associated with the endpoint device based on the monitoring, wherein the network event trigger indicates a change in a connection state of the endpoint device;
in response to the identifying of the network event trigger, initiate a timer that measures a predetermined time period for the endpoint device to rejoin the session;
generate a signoff message; and
send the signoff message to the SaaS provider to cause the SaaS provider to purge the session when the timer reaches the predetermined time period.

19. The non-transitory computer readable medium of claim 18, wherein the network event trigger indicates that the endpoint has disconnected from a network.

20. The non-transitory computer readable medium of claim 18, wherein the SaaS provider purges a token associated with the session in response to the signoff message.

* * * * *